(12) United States Patent
Sridhar et al.

(10) Patent No.: US 9,790,309 B2
(45) Date of Patent: Oct. 17, 2017

(54) GRAFTED TELECHELIC POLYISOBUTYLENES POSSESSING REACTIVE FUNCTIONALITY, PROCESSES FOR PREPARING THE SAME AND CURABLE COMPOSITIONS COMPRISING THE SAME

(71) Applicant: HENKEL IP & HOLDING GMBH, Duesseldorf (DE)

(72) Inventors: Laxmisha Sridhar, Monmouth Junction, NJ (US); Smita Shah, Edison, NJ (US); Andrew D. Messana, Newington, CT (US); Anthony F. Jacobine, Meriden, CT (US)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 14/488,824

(22) Filed: Sep. 17, 2014

(65) Prior Publication Data
US 2015/0005453 A1 Jan. 1, 2015

Related U.S. Application Data

(63) Continuation of application No. PCT/US2013/033637, filed on Mar. 25, 2013.

(60) Provisional application No. 61/639,485, filed on Apr. 27, 2012.

(51) Int. Cl.
*C08F 8/14* (2006.01)
*C08F 269/00* (2006.01)
*C08F 290/04* (2006.01)

(52) U.S. Cl.
CPC ............. *C08F 269/00* (2013.01); *C08F 8/14* (2013.01); *C08F 290/042* (2013.01)

(58) Field of Classification Search
CPC ...... C08F 269/00; C08F 8/14; C08F 290/042; C08F 10/10
See application file for complete search history.

(56) References Cited

U.S. PATENT DOCUMENTS

| | | | |
|---|---|---|---|
| 3,894,119 A | 7/1975 | Forbes et al. | |
| 4,108,749 A | 8/1978 | Bohm et al. | |
| 4,169,836 A | 10/1979 | Ryer et al. | |
| 4,416,921 A | 11/1983 | Dunn | |
| 4,533,723 A * | 8/1985 | Weitemeyer | C08F 8/14 522/103 |
| 4,599,384 A | 7/1986 | Farona et al. | |
| 5,171,760 A | 12/1992 | Kaszas et al. | |
| 5,214,105 A | 5/1993 | Frechet | |
| 5,665,828 A | 9/1997 | Lee | |
| 6,703,433 B1 | 3/2004 | Bahadur et al. | |
| 6,706,779 B2 | 3/2004 | Bahadur et al. | |
| 7,714,053 B2 | 5/2010 | Adler et al. | |
| 2004/0171759 A1 | 9/2004 | Lange et al. | |
| 2010/0040573 A1 | 2/2010 | Garcia Castro et al. | |

FOREIGN PATENT DOCUMENTS

| | | |
|---|---|---|
| DE | 4409259 A1 | 9/1995 |
| EP | 0342792 A1 | 11/1989 |
| EP | 0353471 A2 | 2/1990 |
| JP | H10139813 A | 5/1998 |
| JP | 2000178535 A * | 6/2000 |
| WO | 2011062851 A1 | 5/2011 |

OTHER PUBLICATIONS

EP Search Report for Application No. EP 13780597.4 dated Oct. 28, 2015.
International Search Report for International Application No. PCT/US2013/033637 dated Jul. 8, 2013.
Ivan et al., "Living Carbocationic Polymerization. XXX. One-Pot Synthesis of Allyl-Terminated Linear and Tri-Arm Star Polyisobutylenes, and Epoxy- and Hydroxy-Telechelics Therefrom," Journal of Polymer Science: Part A: Polym. Chem. vol. 28, pp. 89-104 (1990).
Gorski et al., "Functionalized polyisobutenes by SH-en addition," Die Angew. Makromol. Chem. vol. 253, pp. 51-64 (1997).

* cited by examiner

*Primary Examiner* — Mark Kaucher
(74) *Attorney, Agent, or Firm* — James E. Piotrowski

(57) ABSTRACT

Disclosed are reactive functionalized, PIB grafted polymers having an architecture of one or more pendent polyisobutylene moieties grafted on to an organic backbone, wherein the backbone is not polyisobutylene and contains at least one telechelic, reactive functionality. Also a process for making the reactive functionalized, PIB grafted polymer s and curable compositions comprising the reactive functionalized, PIB grafted polymers.

21 Claims, No Drawings

GRAFTED TELECHELIC POLYISOBUTYLENES POSSESSING REACTIVE FUNCTIONALITY, PROCESSES FOR PREPARING THE SAME AND CURABLE COMPOSITIONS COMPRISING THE SAME

FIELD

The present disclosure relates generally to oligomers and polymers having an architecture of one or more pendent polyisobutylene moieties grafted on to an organic backbone, wherein the backbone contains at least one, reactive functionality.

BRIEF DESCRIPTION OF RELATED TECHNOLOGY

Conventional process for preparing telechelic polyisobutylenes (PIBs) possessing reactive functionalities involve low temperature cationic polymerization followed by post-polymerization functionalization. For example, allyl terminated telechelic polyisobutylenes are prepared by cationic polymerization followed by endcapping with allyltrimethyl silane. Telechelic polyisobutylenes containing multifunctional acrylates are conventionally made by esterification reaction of corresponding multifunctional hydroxy terminated polyisobutylenes with acryloyl chloride or acrylic acid. These processes provide a linear, polyisobutylene backbone functionalized at one or both ends, e.g.

X-polyisobutylene backbone-X where X is a reactive functionality such as an acrylate, vinyl ether or allyl moiety. The type of functionalization and number of steps employed in the process make such reactive polyisobutylene materials expensive.

SUMMARY

This disclosure provides functionalized oligomers or polymers having a grafted architecture of one or more pendent polyisobutylene moieties grafted on to a backbone containing at least one polymerizable reactive functionality. For convenience, the disclosed reactive functionalized, PIB grafted oligomers and polymers will be referred to as reactive functionalized, PIB grafted polymers. These reactive functionalized, PIB grafted polymers can be schematically visualized as having a structure:

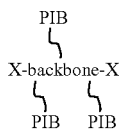

where the backbone is not polyisobutylene; X is a reactive functionality such as a (meth)acrylate, vinyl ether, allyl or maleimide moiety that is terminal to the backbone; and PIB is a polyisobutylene moiety grafted to the backbone. In some preferred embodiments the reactive functionality is (meth)acrylate. As used herein (meth)acrylate includes acrylates and methacrylates.

The disclosed reactive functionalized, PIB grafted polymers are structurally different from known polyisobutylene oligomers and polymers and provide new and different cured networks with new and different properties. Cured products of the disclosed polymers have potential advantages such as superior gas and moisture barrier properties and improved adhesion to low surface energy substrates.

This disclosure also provides processes useful for making the disclosed reactive functionalized, PIB grafted polymers employing readily available polyisobutylenesuccinic anhydride as a raw material to functionalize hydroxyl or amino groups present on mono or multifunctional (meth)acrylates, vinyl ethers, allyl ethers etc. The functionality in the reactive functionalized, PIB grafted polymers end product is determined by the functionality present in the hydroxy or amino functionalized (meth)acrylate, vinyl ether, or allyl ether starting material.

This disclosure also provides a curable composition comprising the disclosed reactive functionalized, PIB grafted polymers. Cured products of the curable composition have properties advantageous for use as an adhesive or sealant.

The disclosed compounds include any and all isomers and stereoisomers. In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure.

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

DETAILED DESCRIPTION

One embodiment describes a reactive functionalized, PIB grafted polymer having polyisobutylene grafted on to a backbone containing end reactive functionality, represented by the formula;

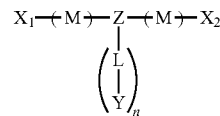

Z is an organic backbone having a generally linear chain structure having 1 to about 50 atoms, advantageously 1 to about 20 atoms and more advantageously 1 to about 10 atoms. The Z structure can comprise one or more aliphatic groups, one or more aromatic groups, one or more heteroatoms or any combination thereof. The Z structure can include one or more of branching, pendant aliphatic groups, pendant aromatic groups and pendant heteroatoms. Z will not be polyisobutylene.

Each M links one of $X_1$ and $X_2$ to one atom of the Z organic backbone. Each M is independently selected from a covalent bond or an organic structure having 1 to about 20 atoms, advantageously 1 to about 10 atoms. Exemplary M structures include a covalent bond, heteroatom, $C_{1-10}$ alkyl, $C_{6-10}$ aryl, amide, urethane, urea, $C_{3-6}$ cycloaliphatic, $C_{6-10}$ cycloaryl and polyether. M may include within that structure one or more linear, branched or cyclic portions; one or more saturated, unsaturated or aromatic portions; one or more substituents selected from carbonyl, amide, alkyl, $C_{3-6}$ cycloalkyl, $C_{6-10}$ cycloaryl; one or more heteroatoms such as N, O or S atoms; or any combination thereof.

$X_1$ and $X_2$ are independently selected from H or a reactive functionality, but at least one of $X_1$ and $X_2$ must be a reactive functionality. Exemplary reactive functionalities include acrylate, methacrylate, acrylamide, allyl, styrenic, vinyl ether, maleimide and N-vinylamide. Preferably, both $X_1$ and $X_2$ comprise an independently selected reactive functionality. More preferably, both $X_1$ and $X_2$ comprise an independently selected acrylate reactive functionality or methacrylate reactive functionality.

Y is polyisobutylene group.

L connects the polyisobutylene group to one atom of the Z organic backbone or one atom of the M portion. The polyisobutylene group does not have to be in a terminal position on the L linker. L is selected from a covalent bond or an organic structure having 1 to about 30 atoms, advantageously 1 to about 20 atoms and more advantageously 1 to about 10 atoms. L may include within that structure one or more linear, branched or cyclic portions, one or more saturated, unsaturated or aromatic portions, one or more heteroatoms such as N, O or S atoms, or any combination thereof. Some exemplary L structures include $C_{1-5}$ alkyl, a heteroatom, ester, thioester, amide, imide, cyclic imide, ketone, carboxyl, urethane, carbonate, urea and combinations thereof. If L is a covalent bond the polyisobutylene group is directly bonded to the Z organic backbone atom. If there are multiple L linkers each is independently selected and can be different from, or the same as, the other L linkers.

n is an integer from 1-10.

One embodiment describes a reactive functionalized, PIB grafted polymer having polyisobutylene grafted on to a backbone containing end reactive functionality, represented by the formula;

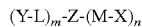

Z is an organic backbone having a generally linear chain structure having 1 to about 50 atoms, advantageously 1 to about 20 atoms and more advantageously 1 to about 10 atoms. The Z structure can comprise one or more aliphatic groups, one or more aromatic groups, one or more heteroatoms or any combination thereof. The Z structure can include one or more of branching, pendant aliphatic groups, pendant aromatic groups and pendant heteroatoms. Z will not be polyisobutylene.

Each M links one X to one atom of the Z organic backbone. Each M is independently selected from a covalent bond or an organic structure having 1 to about 20 atoms, advantageously 1 to about 10 atoms. Exemplary M structures include a covalent bond, heteroatom, $C_{1-10}$ alkyl, $C_{6-10}$ aryl, amide, urethane, urea, $C_{3-6}$ cycloaliphatic, $C_{6-10}$ cycloaryl and polyether. M may include within that structure one or more linear, branched or cyclic portions; one or more saturated, unsaturated or aromatic portions; one or more substituents selected from carbonyl, amide, alkyl, $C_{3-6}$ cycloalkyl, $C_{6-10}$ cycloaryl; one or more heteroatoms such as N, O or S atoms; or any combination thereof.

Each X is independently H or a reactive functionality, but at least one X must be a reactive functionality. Exemplary reactive functionalities include acrylate, methacrylate, acrylamide, allyl, styrenic, vinyl ether, maleimide and N-vinylamide. Preferably, X is an acrylate reactive functionality or methacrylate reactive functionality. More preferably, each X is an independently selected acrylate reactive functionality or methacrylate reactive functionality.

Y is polyisobutylene group.

L connects the polyisobutylene group Y one atom of the Z organic backbone. The polyisobutylene group does not have to be in a terminal position on the L linker. L is selected from a covalent bond or a structure having 1 to about 30 atoms, advantageously 1 to about 20 atoms and more advantageously 1 to about 10 atoms. L may include one or more linear, branched or cyclic portions, one or more saturated, unsaturated or aromatic portions, one or more heteroatoms such as N, O or S atoms, or any combination thereof. Some exemplary L portions include $C_{1-5}$ alkyl, a heteroatom, ester, thioester, amide, imide, cyclic imide, ketone, carboxyl, urethane, carbonate, urea and combinations thereof. If L is a covalent bond the polyisobutylene group is directly bonded to the Z organic backbone. If there are multiple L linkers each is independently selected and can be different from, or the same as, the other L linkers.

m and n are each independently an integer from 1-10.

One embodiment describes a reactive functionalized, PIB grafted polymer having a telechelic polyisobutylene grafted on to a backbone containing end reactive functionality, represented by the formula;

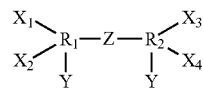

Z is an organic backbone having a generally linear chain structure of 1 to about 50 atoms, advantageously 1 to about 20 atoms and more advantageously 1 to about 10 atoms. Z can be saturated or unsaturated. The Z structure can comprise one or more aliphatic groups, one or more aromatic groups, one or more heteroatoms or any combination thereof. The Z structure can include one or more of branching, pendant aliphatic groups, pendant aromatic groups and pendant heteroatoms. Z will not be polyisobutylene.

$X_1$, $X_2$, $X_3$ and $X_4$ are each independently selected from H or a reactive functionality, but at least one of $X_1$, $X_2$, $X_3$ and $X_4$ must be a reactive functionality. Exemplary reactive functionalities include acrylate, methacrylate, acrylamide, allyl, styrenic, vinyl ether, maleimide and N-vinylamide. Preferably, all of $X_1$, $X_2$, $X_3$ and $X_4$ comprise an independently selected reactive functionality. More preferably, all of $X_1$, $X_2$, $X_3$ and $X_4$ comprise an independently selected acrylate or methacrylate reactive functionality.

Each Y is a polyisobutylene group.

R1 and R2 are segments connecting reactive functionalities $X_1$, $X_2$, $X_3$ and $X_4$ and PIB groups Y to the backbone Z. $R_1$ and $R_2$ are each independently selected organic structures having 1 to about 30 atoms, advantageously 1 to about 20 atoms and more advantageously 1 to about 10 atoms. $R_1$ and $R_2$ may each independently include within that structure one or more linear, branched or cyclic portions, one or more saturated, unsaturated or aromatic portions, one or more heteroatoms such as N, O or S atoms, or any combination thereof. Exemplary $R_1$ and $R_2$ portions include a heteroatom, $C_{1-10}$ alkyl, $C_{6-10}$ aryl.

The reactive functionalized, PIB grafted polymers in any disclosed embodiment can be used as part of a thermal or photo curable composition suitable for use as an adhesive or sealant.

The reactive functionalized, PIB grafted polymers in any disclosed embodiment has a maximum molecular weight of about 30000 and a preferred molecular weight of about 10,000 or less, and a more preferred molecular weight of 1000 to 10,000. Unless otherwise specified all molecular weights are on a weight average basis (Mw).

The reactive functionalized, PIB grafted polymers can be a liquid, a paste or a solid. If solid, the telechelic polymer can be formed in a convenient shape such as a film. Preferably, the telechelic polymer is a viscous liquid or paste. Viscosity of liquid or paste telechelic polymers can range from 10,000 cPs to about 5,000,000 cPs measured by either Brookfield viscometer (Model DV-11) or by ARES-M rheometer. As used herein a liquid will flow under gravity at room temperature (about 70° F.); a paste may or may not flow under gravity at room temperature but can be pumped; and a solid will not flow under gravity at room temperature and can not be pumped at room temperature.

Synthesis of Reactive Functionalized, PIB Grafted Polymers

Synthesis of Polyisobutylene Grafted Acrylates, Methacrylates, Acrylamides

One process for the synthesis of polyisobutylene grafted multifunctional (meth)acrylate polymers involves reaction of hydroxyl, amino or thiol group containing diacrylates with commercially available polyisobutylenesuccinic anhydride (PIBSA) optionally in the presence of a solvent and catalytic amount of a base or Lewis acid. Lower molecular weight (less than about 2300 Mn, PIBSA is available commercially from suppliers such as BASF and Texas Petrochemicals group. Synthetic procedures for manufacture of higher molecular weight (about 2300 Mw) PIBSA are known. See, for example, U.S. Pat. No. 4,169,836, the contents of which are incorporated in their entirety.

Using this approach several polyisobutylene grafted diacrylates and methacrylates such as PIB acrylate 1; PIB acrylate 2; and PIB acrylate 3 were made from corresponding monohydroxy or dihydroxy diacrylates or methacrylates as shown in FIG. 1.

The corresponding hydroxyacrylate starting materials are commercially available from Sigma-Aldrich. The reaction could be performed neat at higher temperature or optionally a solvent such as THF, dichloromethane, 1,2-dichloromethane and aliphatic or aromatic hydrocarbons such as hexane and toluene can be used. Lewis bases and Lewis acids can optionally be used as catalysts to accelerate the reaction. Some examples of Lewis bases include tertiary amines such as triethylamine, DMAP. Some examples of Lewis acid catalysts include zinc perchlorate, bismuth triflate, trimethylsilyltrifluoromethane sulfonate, all commercially available from Sigma-Aldrich.

FIG. 1: Synthesis of PIB grafted multifunctional acrylates.

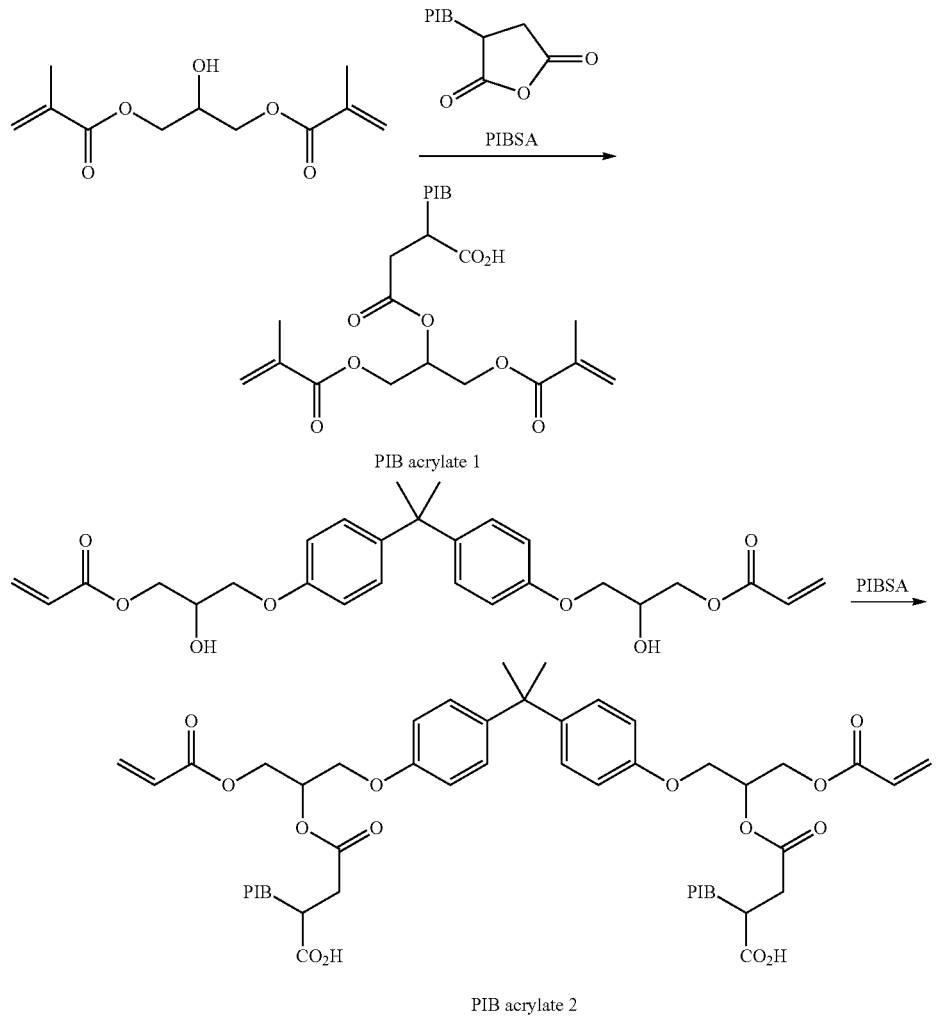

-continued

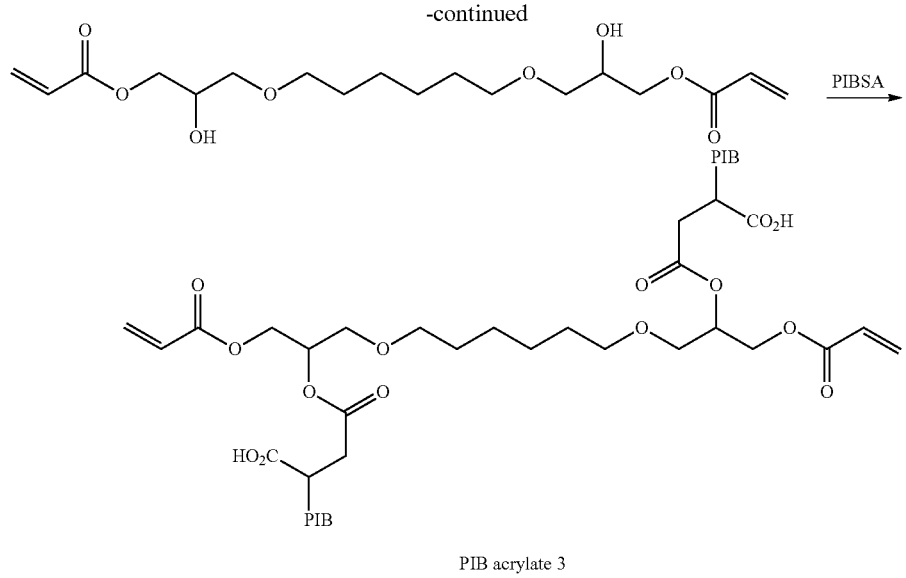

PIB acrylate 3

Similarly, the corresponding PIB grafted acrylamides can be prepared by reacting the commercially available (Sigma-Aldrich) dihydroxy bisacrylamide shown below with PIBSA.

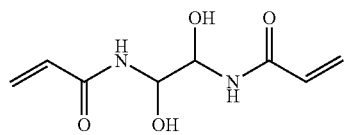

With diacrylates possessing multiple hydroxyl groups on the backbone, the ratio of diacrylate to PIBSA could be altered to obtain one, two or three PIB units grafted on the diacrylate backbone as shown in FIG. 2. Thus, PIB acrylates 4, 5 and 6 were obtained by reacting the commercially available (Sigma-Aldrich) trihydroxy diacrylate with an appropriate stoichiometric amount of PIBSA. GPC was used as an analytical technique to confirm grafting of multiple polyisobutylene units on the trihydroxy diacrylate compound. In contrast to conventional methods, in which the polyisobutylene molecular weight is controlled during low temperature cationic polymerization, this method offers an opportunity to control the molecular weight of the PIB grafted acrylate polymer during the grafting process. This controlled grafting of PIB also offers an opportunity to adjust PIB loading of the polymer to advantageously enhance low surface energy adhesion.

FIG. 2: Synthesis of polyisobutylene grafted diacrylates

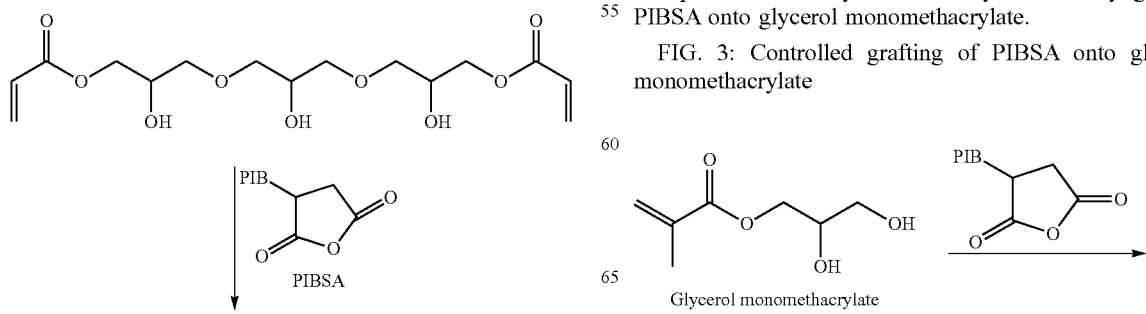

1:1 ratio

PIB acrylate 4

1:2 ratio

PIB acrylate 5

1:3 ratio

PIB acrylate 6

A similar controlled grafting could be performed on a dihydroxy monomethacrylate also as shown in FIG. 3. Using this process PIB acrylate 7 was synthesized by grafting PIBSA onto glycerol monomethacrylate.

FIG. 3: Controlled grafting of PIBSA onto glycerol monomethacrylate

Glycerol monomethacrylate

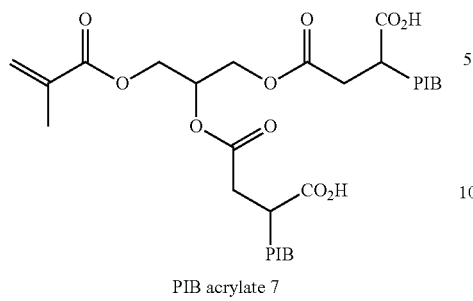

PIB acrylate 7

In contrast to the PIB diacrylates shown in FIGS. 1, 2, and 3 in which several polyisobutylene units are connected to the acrylate backbone at different points along the backbone, multiple polyisobutylene units could also be connected to the backbone at a single point. Some examples include those shown in FIG. 4, obtainable by the reaction of PIBSA with commercially available (Sigma-Aldrich) polyhydroxy acrylates and acrylamide starting materials FIG. 4: Synthesis of PIB grafted acrylates/acrylamides connected to the backbone at a single point on the backbone

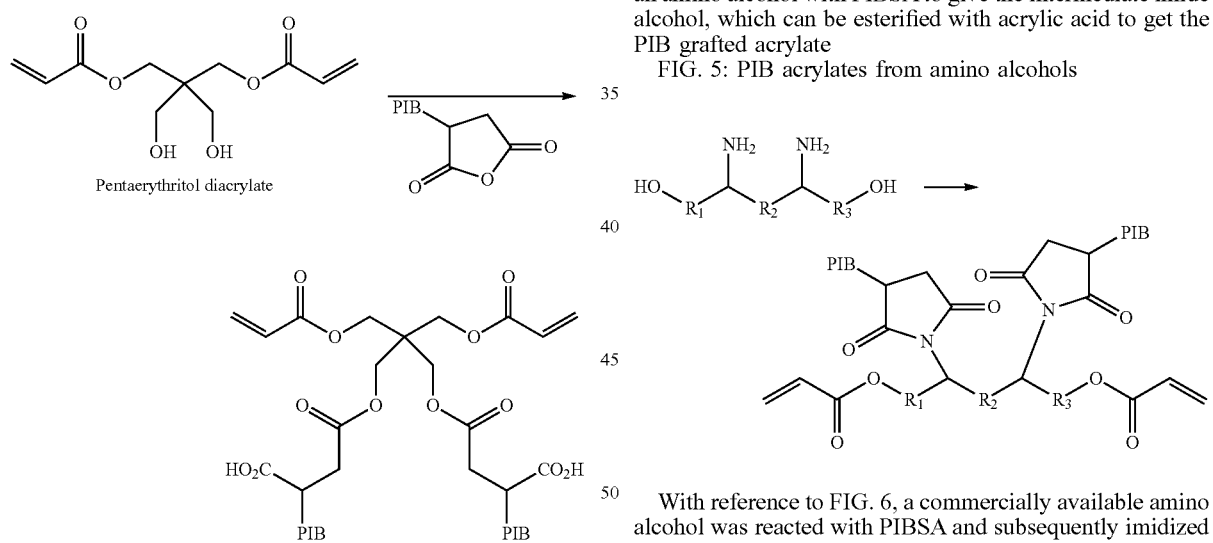

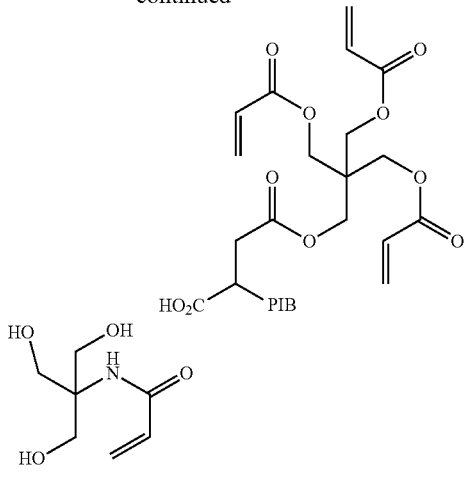

N-[Tris(hydroxymethyl)methyl]acrylamide

In all of the synthesis described above in FIGS. 1, 2, 3 and 4 a carboxylic acid group is generated per polyisobutylene group during the grafting process. In some thermal and photo curable compositions, particularly compositions containing epoxy acrylates, it is not desirable to have a free carboxylic acid group along with epoxy functionality. For such curable compositions, a carboxylic acid free grafting process was developed starting from amino alcohols as shown schematically in FIG. 5. This involves imidization of an amino alcohol with PIBSA to give the intermediate imide alcohol, which can be esterified with acrylic acid to get the PIB grafted acrylate FIG. 5: PIB acrylates from amino alcohols

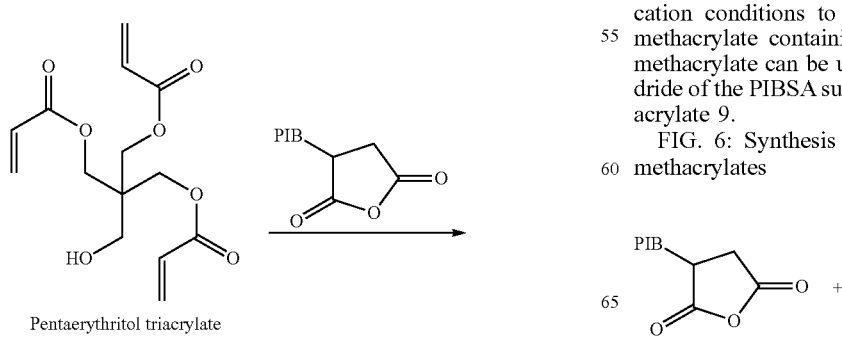

With reference to FIG. 6, a commercially available amino alcohol was reacted with PIBSA and subsequently imidized to give the intermediate imidoalcohol. The imidoalcohol was esterified with methacrylic acid under Fischer esterification conditions to give PIB acrylate 8. Conversely, a methacrylate containing amine such as t-butylaminoethyl methacrylate can be used for the ring opening of the anhydride of the PIBSA subsequent cyclization would afford PIB acrylate 9.

FIG. 6: Synthesis of carboxylic acid free PIB grafted methacrylates

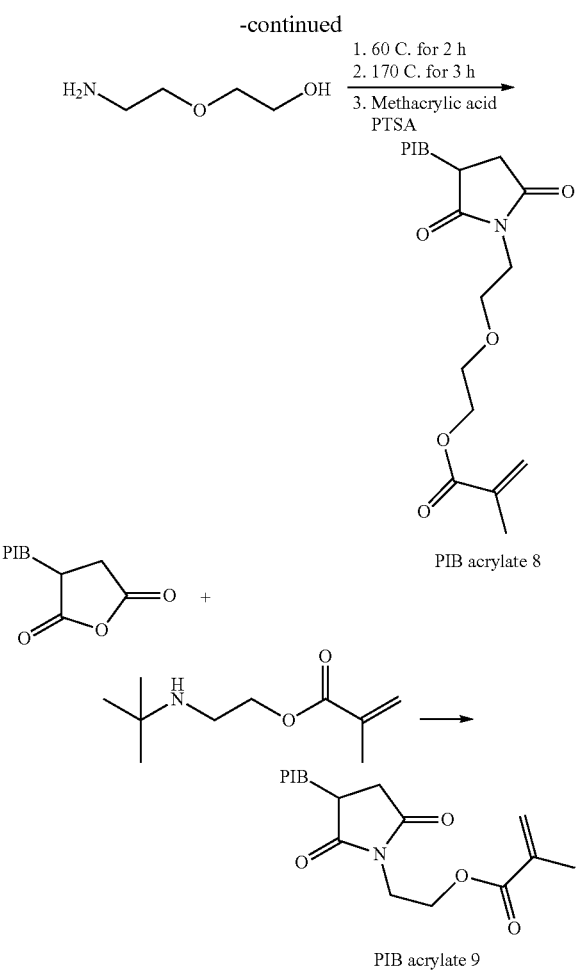

PIB acrylate 8

PIB acrylate 9

Some examples of amino alcohols that can be used in the aforementioned grafting and esterification sequence are shown in FIG. 7. These include, but are not limited to, 3-amino-1,2-propanediol, serinol, 1,3-diamino-2-propanol and tris(hydroxymethyl)aminomethane, all of which are commercially available from Sigma-Aldrich. Secondary amino alcohols can be used to provide the corresponding amide acrylate or methacrylates. Some examples of secondary amino alcohols include, but are not limited to, 3-methylamino-1,2-propanediol, diethanolamine and N,N'-bis(2-hydroxyethyl)ethylenediamine shown in FIG. 7.

FIG. 7: Examples of amino alcohols that can be used in the grafting and subsequent esterification with acrylic acid or methacrylic acid

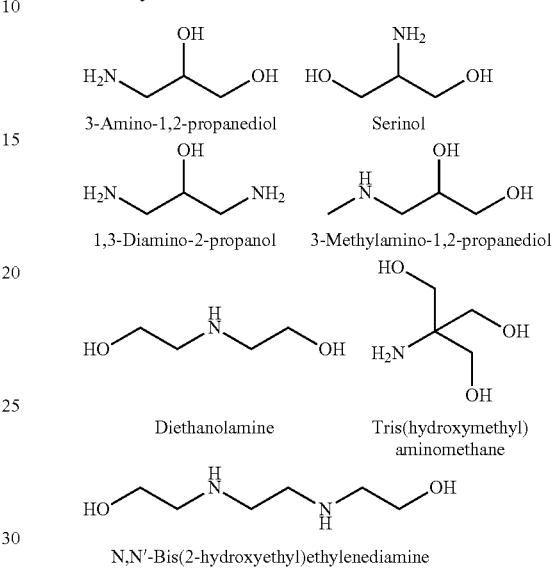

Another approach to obtain grafted architecture PIB acrylates is schematically presented in FIG. 8. In this approach, PIB acrylate 10, which can be obtained by the reaction of PIBSA with hydroxyethyl methacrylate, can be reacted with a multifunctional vinyl ether to afford PIB acrylate 11 by carboxylic acid-vinyl ether addition reaction. PIB acrylate 11 has a grafted architecture of PIB along the diacrylate backbone.

FIG. 8: PIB grafted acrylates by carboxylic acid-vinyl ether addition reaction.

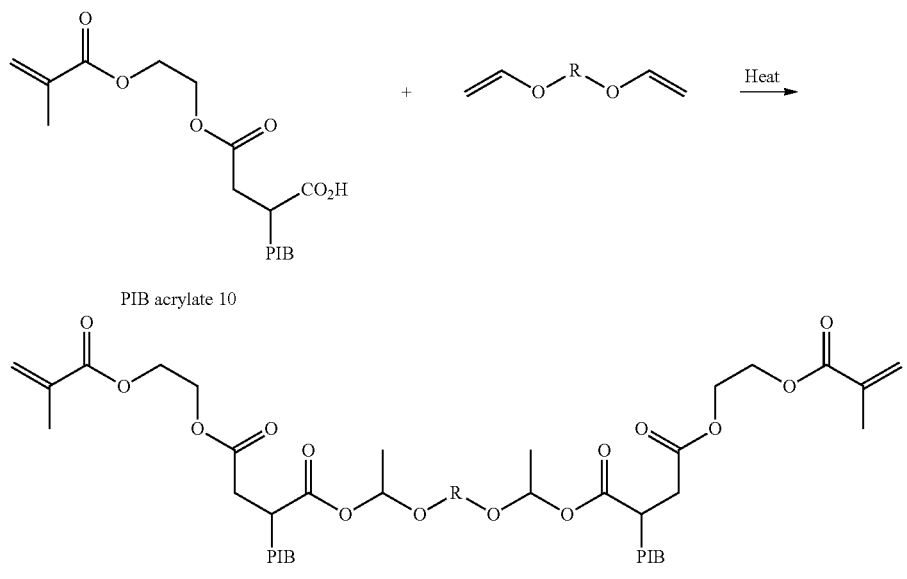

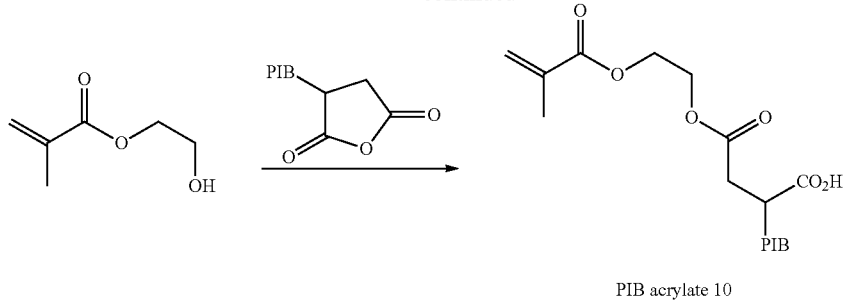

PIB acrylate 10

PIB acrylate 10 can be reacted with a multifunctional vinyl ether to afford a PIB acrylate polymer by carboxylic acid-vinyl ether addition reaction. This PIB acrylate polymer has a grafted architecture of PIB along the diacrylate backbone.

PIB acrylate 10 and two vinyl ethers (ethyl vinyl ether and 2-hydroxyethyl vinyl ether) were reacted to obtain PIB acrylate 12 and 13 (FIG. 9) by the carboxylic acid-vinyl ether addition reaction under both thermal and microwave conditions. This method was extended to other vinyl ethers such as 1,4-butanediol divinyl ether, vinyl ether ethyl methacrylate, to obtain corresponding PIB grafted diacrylates. Additional examples of vinyl ethers that could be used in this addition reaction include, but not limited to vinyl ethers that belong to the VECTOMER series, 1,4-cyclohexanedimethanol divinyl ether, Bis[4-(vinyloxy)butyl](4-methyl-1,3-phenylene)biscarbamate, Bis[4-(vinyloxy)butyl](methylenedi-4,1-phenylene)biscarbamate, Bis[4-(vinyloxy)butyl] 1,6-hexanediylbiscarbamate, Bis[4-(vinyloxy)butyl] isophthalate, Bis[4-(vinyloxybutyl]succinate, Bis[4-(vinyloxy)butyl]terephthalate, Bis[4-(vinyloxymethyl)cyclohexylmethyl]glutarate, di(ethylene glycol) divinyl ether and tris[4-(vinyloxy)butyl]trimellitate.

FIG. 9: PIB acrylates 12 and 13 made by the vinyl ether-carboxylic acid addition reaction An approach to obtain polyisobutylene grafted allyl amides, allyl ethers and vinyl ethers involves reaction of appropriately substituted starting materials with PIBSA. For example the diallyl grafted polyisobutylene shown in FIG. 10 was made by the reaction of commercially available diallyl amine (Sigma-Aldrich) with PIBSA. Other examples of allyl substrates that could be used for similar grafting with PIBSA include, but are not limited to, 3-allyloxy-1,2-propanediol, trimethylolpropane allyl ether, pentaerythritol diallyl ether, trimethylolpropane diallyl ether, aminoethyl vinyl ether, all of which are commercially available from Sigma-Aldrich.

FIG. 10: Grafting of PIBSA to allyl substituted monomers

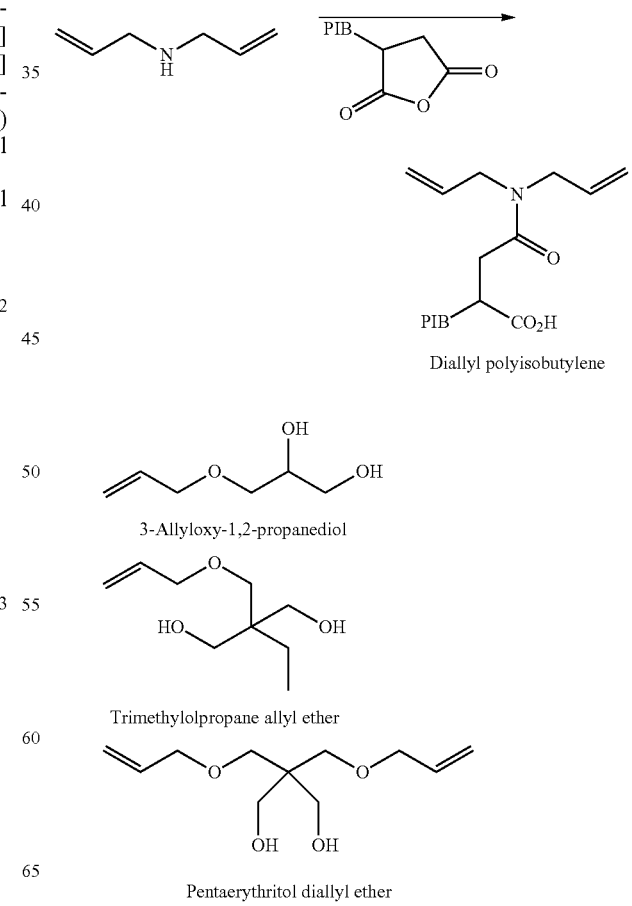

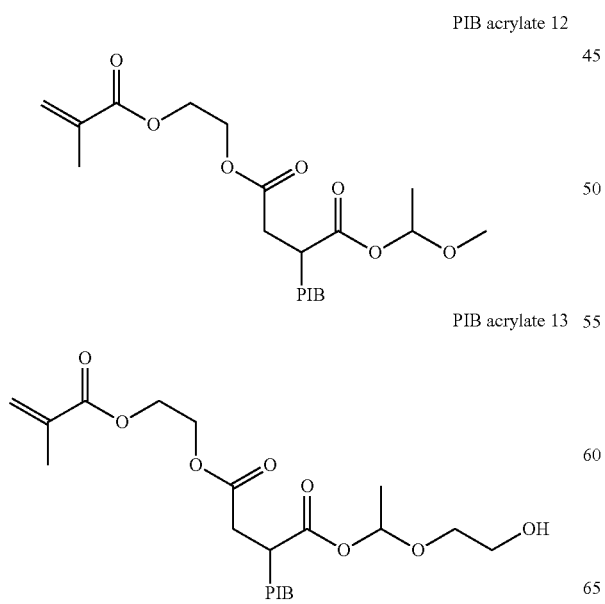

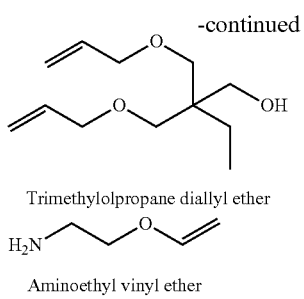

Trimethylolpropane diallyl ether

Aminoethyl vinyl ether

Curable Compositions Comprising Reactive Functionalized, PIB Grafted Polymers.

The disclosed reactive functionalized, PIB grafted polymers can be used as the basis of a thermal or photo curable composition suitable for use as an adhesive or sealant.

Desirably, the composition includes a cure-inducing component that can initiate free radical cure mechanism of the polymer. In one embodiment the initiating component is a photoinitiator. Photoinitiators enhance the rapidity of the curing process when the curable composition as a whole is exposed to electromagnetic radiation, such as actinic radiation. Useful actinic radiation includes ultraviolet light, visible light, and combinations thereof. Desirably, the actinic radiation used to cure the liquid gasket-forming material has a wavelength from about 200 nm to about 1,000 nm. Useful UV includes, but is not limited to, UVA (about 320 nm to about 410 nm), UVB (about 290 nm to about 320 nm), UVC (about 220 nm to about 290 nm) and combinations thereof. Useful visible light includes, but is not limited to, blue light, green light, and combinations thereof. Such useful visible lights have a wavelength from about 450 nm to about 550 nm.

Examples of suitable photoinitiators for use herein include, but are not limited to, photoinitiators available commercially from Ciba Specialty Chemicals, under the "IRGACURE" and "DAROCUR" trade names, specifically "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl) phosphine oxide and 2-hydroxy-2-methyl-1-phenyl-propan-1-one), and 819 [bis(2,4,6-trimethyl benzoyl) phenyl phosphine oxide] and "DAROCUR" 1173 (2-hydroxy-2-methyl-1-phenyl-1-propan-1-one) and 4265 (the combination of 2,4,6-trimethylbenzoyldiphenyl-phosphine oxide and 2-hydroxy-2-methyl-1-phenyl-propan-1-one); and the visible light [blue] photoinitiators, dl-camphorquinone and "IRGACURE" 784DC. Of course, combinations of these materials may also be employed herein.

Other photoinitiators useful herein include alkyl pyruvates, such as methyl, ethyl, propyl, and butyl pyruvates, and aryl pyruvates, such as phenyl, benzyl, and appropriately substituted derivatives thereof. Photoinitiators particularly well-suited for use herein include ultraviolet photoinitiators, such as 2,2-dimethoxy-2-phenyl acetophenone (e.g., "IRGACURE" 651), and 2-hydroxy-2-methyl-1-phenyl-1-propane (e.g., "DAROCUR" 1173), bis(2,4,6-trimethyl benzoyl) phenyl phosphine oxide (e.g., "IRGACURE" 819), and the ultraviolet/visible photoinitiator combination of bis (2,6-dimethoxybenzoyl-2,4,4-trimethylpentyl) phosphine oxide and 2-hydroxy-2-methyl-1-phenyl-propan-1-one (e.g., "IRGACURE" 1700), as well as the visible photoinitiator bis ($\eta^5$-2,4-cyclopentadien-1-yl)-bis[2,6-difluoro-3-(1H-pyrrol-1-yl)phenyl]titanium (e.g., "IRGACURE" 784DC).

The radical cure-inducing component can also be a heat-cure initiator (i.e., an ingredient or a combination of ingredients which at the desired elevated temperature conditions, e.g., from about 90° C. to about 150° C. (about 194° F. to about 302° F.) produces free radicals). Suitable initiators may include peroxy materials, e.g., peroxides, hydroperoxides, and peresters, which under appropriate elevated temperature conditions decompose to form peroxy free radicals which are initiatingly effective for the polymerization of the heat-curable compositions. The peroxy materials may be employed in the radical cure-inducing component in concentrations on the order of about 0.1% to about 10%, preferably 0.1% to 3% by weight of composition.

Another useful class of heat-curing initiators comprises azonitrile compounds which yield free radicals when decomposed by heat. Heat is applied to the curable composition and the resulting free radicals initiate polymerization of the curable composition.

For example, azonitrile may be a compound of the formula:

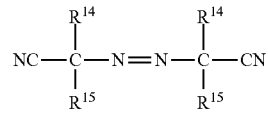

where each $R^{14}$ is independently selected from a methyl, ethyl, n-propyl, iso-propyl, iso-butyl or n-pentyl radical, and each $R^{15}$ is independently selected from a methyl, ethyl, n-propyl, iso-propyl, cyclopropyl, carboxy-n-propyl, iso-butyl, cyclobutyl, n-pentyl, neopentyl, cyclopentyl, cyclohexyl, phenyl, benzyl, p-chlorobenzyl, or p-nitrobenzyl radical or $R^{14}$ and $R^{15}$, taken together with the carbon atom to which they are attached, represent a radical of the formula

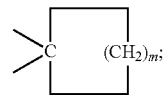

where m is an integer from 3 to 9, or the radical, or

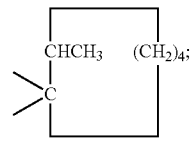

Compounds of the above formula are more fully described in U.S. Pat. No. 4,416,921, the disclosure of which is incorporated herein by reference.

Azonitrile initiators of the above-described formula are readily commercially available, e.g., the initiators which are commercially available under the trademark VAZO from E.I. DuPont de Nemours and Company, Inc., Wilmington, Del., including VAZO 52 ($R^{14}$ is methyl, $R^{15}$ is isobutyl), VAZO 64 ($R^{14}$ is methyl, $R^{15}$ is methyl), and VAZO 67 ($R^{14}$ is methyl, $R^{15}$ is ethyl), all such $R^{14}$ and $R^{15}$ constituents being identified with reference to the above-described azonitrile general formula. A desirable azonitrile initiator is 2,2'-azobis(iso-butyronitrile) or AIBN.

The azonitrile may be employed in the cure-inducing component in concentrations on the order of about 500 to about 10,000 parts per million (ppm) by weight of composition, desirably about 1,000 to about 5,000 ppm.

The curable composition can comprise a curable co-reactant component. One useful class of curable co-reactant components include at least one compound selected from a multifunctional alcohol, a polyamine, a polythiol, and combinations thereof. Other useful curable co-reactant components include those obtained by reacting polyamines containing terminal, primary and secondary amine groups or polyhydric alcohols, for example, the alkane, cycloalkane, alkene and cycloalkene polyols such as glycerol, ethylene glycol, bisphenol-A, 4,4'-dihydroxy-phenyldimethylmethane-substituted bisphenol-A, and the like. Useful alcohols include, without limitation, polyethylene glycol ethers having 3-7 ethylene oxide repeating units and terminal hydroxy groups; polyether alcohols; polyester alcohols; as well as alcohols based on polybutadiene. One useful alcohol is 1,4-butanediol. Additional useful alcohols include, without limitation, castor oil, glycerin, polyethylene glycol, etherdiol, ethylene glycol, caprolactone polyols and combinations thereof.

Another useful class of curable co-reactant components are acrylates, for example the poly- and mono-functional (meth)acrylate esters. (Meth)acrylate esters include both acrylic esters and methacrylic esters. Some useful (meth) acrylic esters have the general structure $CH_2=C(R)COOR^1$, where R is H, $CH_3$, $C_2H_5$ or halogen, such as Cl, and $R^1$ is $C_{1-16}$ mono- or bicycloalkyl, a 3 to 8-membered heterocyclic radical with a maximum of two oxygen atoms in the heterocycle, H, alkyl, hydroxyalkyl or aminoalkyl where the alkyl portion is $C_{1-8}$ straight or branched carbon atom chain.

Some exemplary monofunctional polymerizable (meth) acrylate ester monomers include hydroxypropyl methacrylate, 2-hydroxyethyl methacrylate, methyl methacrylate, tetrahydrofurfuryl methacrylate, cyclohexyl methacrylate, 2-aminopropyl methacrylate, isobornyl methacrylate and the corresponding acrylates. Some exemplary polyfunctional monomers include polyethylene glycol dimethacrylate and dipropylene glycol dimethacrylate.

Some useful acrylates include those which fall within the structure:

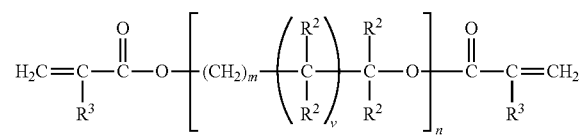

where $R^2$ may be selected from hydrogen, alkyl of 1 to about 4 carbon atoms, hydroxyalkyl of 1 to about 4 carbon atoms or

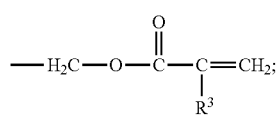

$R^3$ may be selected from hydrogen, halogen, and alkyl of 1 to about 4 carbon atoms and $C_{1-8}$ mono- or bicycloalkyl, a 3 to 8 membered heterocyclic radical with a maximum of 2 oxygen atoms in the ring;
$R^4$ may be selected from hydrogen, hydroxy and

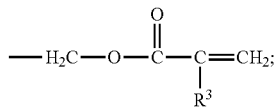

m is an integer equal to at least 1, e.g., from 1 to about 8 or higher, for instance from 1 to about 4;
n is an integer equal to at least 1, e.g., 1 to about 20 or more; and
v is 0 or 1.

Some useful acrylates are urethane acrylates including those that fall within the general structure:

where $R^5$ is H, $CH_3$, $C_2H_5$ or halogen, such as Cl; $R^6$ is (i) a $C_{1-8}$ hydroxyalkylene or aminoalkylene group, (ii) a $C_{1-6}$ alklamino-$C_{1-5}$ alkylene, a hydroxyphenylene, aminophenylene, hydroxynaphthalene or amino-naphthalene optionally substituted by a $C_{1-3}$ alkyl, $C_{1-3}$ alkylamino or di-$C_{1-3}$ alkylamino group; and $R^7$ is $C_{2-20}$ alkylene, alkenylene or cycloalkylene, $C_{6-40}$ arylene, alkarylene, aralkarylene, alkyloxyalkylene or aryloxyarylene optionally substituted by 1-4 halogen atoms or by 1-3 amino or mono- or di-$C_{1-3}$ alkylamino or $C_{1-3}$ alkoxy groups. Other useful urethane acrylates include those that fall within the general structure:

where $R^5$, $R^6$, and $R^7$ are as given above; $R^8$ is a non-functional residue of a polyamine or a polyhydric alcohol having at least n primary or secondary amino or hydroxy groups respectively; X is O or $NR^9$, where $R^9$ is H or a $C_{1-7}$ alkyl group; and n is an integer from 2 to 20.

Other useful acrylates can be selected from the class of the acrylate, methacrylate and glycidyl methacrylate esters of bisphenol A. Particularly useful are ethoxylated bisphenol-A-dimethacrylate ("EBIPMA").

Other useful acrylates include those which are exemplified but not restricted to the following materials: di-, tri-, and tetra-ethylene glycol dimethacrylate, dipropylene glycol dimethacrylate, polyethylene glycol dimethacrylate, di(pentamethylene glycol) dimethacrylate, tetraethylene glycol diacrylate, tetraethylene glycol di(chloroacrylate), diglycerol diacrylate, diglycerol tetramethacrylate, tetramethylene dimethacrylate, ethylene dimethacrylate, neopentyl glycol diacrylate and trimethylol propane triacrylate.

The acrylate co-reactant component need not be in the pure state, but may comprise commercial grades in which inhibitors or stabilizers, such as polyhydric phenols, quinones, and the like are included. These materials function as free radical inhibitors to prevent premature polymerization of the acrylate co-reactant component. It is also within the scope of the present disclosure to obtain modified characteristics for the cured composition by utilization of one or more monomers either from those listed above or additional additives such as unsaturated monomers, including unsaturated hydrocarbons and unsaturated esters.

The curable composition includes from about 1% to about 99% by weight of composition of reactive functionalized, PIB grafted polymer. Preferably, the curable composition includes from about 10% to about 50% reactive functionalized, PIB grafted polymer by weight of composition.

The curable composition can optionally include from about 1% to about 99% by weight of composition of one or more co-reactant components. Preferably, the curable composition includes from about 50% to about 90% co-reactant component by weight of composition.

The curable composition can optionally include from about 0.1% to about 10% by weight of composition of one or more cure-inducing components. Preferably, the curable composition can optionally include from about 0.1% to about 3% by weight of composition of one or more cure-inducing components.

The curable composition can optionally include from about 0% to about 90% by weight, more typically 10% to 30% by weight of composition of filler, such as fumed silica; from about 0% to about 20% by weight of composition of rheology modifier; from about 0% to about 20% by weight of composition of adhesion promoter; from about 0% to about 20% by weight of composition of fluorescent agent or pigment; from about 0% to about 20% by weight of composition of other additives known in the sealant arts, such as antioxidants, thickeners, plasticizers, pigments, dyes, diluents and solvents to produce desired functional characteristics, providing they do not significantly interfere with the ability of the curable composition to polymerize and provide a seal. In certain cases the filler and the rheology modifier can be the same.

The composition can include components (including resins) or fillers that improve refractive index of the cured polymer. Examples include transition metal acrylates such as zirconium acrylates; sulfur containing compounds and compounds containing aromatic groups. These refractive index improving components are advantageous for use of the composition in certain applications such as solar panel encapsulation.

The following examples are included for purposes of illustration so that the disclosure may be more readily understood and are in no way intended to limit the scope of the disclosure unless otherwise specifically indicated.

Synthesis of Reactive Functionalized, PIB Grafted Polymers

Synthesis of PIB Acrylate 1

In a 2 L 4 necked flask equipped with a mechanical stirrer and reflux condenser was taken a mixture of 2300 molecular weight PIBSA (952 g, 405 mmol), glycerol dimethacrylate (92.5 g, 405 mmol), triethylamine (0.82 g, 8.1 mmol) and MeHQ (as used herein MeHq is methylhydroquinone) (2.09 g, 2000 ppm). The contents were mixed slowly using a mechanical stirrer. Once sufficient mixing of ingredients was achieved, the mixture was heated with stirring using an oil bath at about 110° C. for about 3 hours (reaction temperature about 104-105° C.). The conversion was monitored by IR disappearance of anhydride bands.

The same procedure was applied for the synthesis of PIB diacrylate using 1000 molecular weight PIBSA.

Synthesis of PIB Acrylate 2

In a 2 L 4 necked flask equipped with a mechanical stirrer and reflux condenser was taken a mixture of 950 molecular weight PIBSA (498 g, 488 mmol), bisphenol A-glycerolate diacrylate (118 g, 244 mmol), triethylamine (1.1 g, 10.87 mmol) and MeHQ (924 mg, 1500 ppm). The contents were mixed slowly using a mechanical stirrer. Once sufficient mixing of ingredients was achieved, the mixture was heated with stirring using an oil bath at about 100° C. for about 4 h and at 110° C. for about 45 minutes (reaction temperature about 104-105° C.). The conversion was monitored by IR disappearance of anhydride bands.

The same procedure was used for the synthesis of PIB diacrylate based on 1000 Mw PIBSA. It is believed that 2300 Mw PIBSA could also be used for this synthesis.

Synthesis of PIB Acrylate 3

In a 2 L 4 necked flask equipped with a mechanical stirrer and reflux condenser was taken a mixture of 950 molecular weight PIBSA (511 g, 500 mmol), 1,6-Hexanediylbis[oxy(2-hydroxy-3,1-propanediyl)]bisacrylate (94 g, 250 mmol), triethylamine (1.13 g, 11.12 mmol) and MeHQ (906 mg, 1500 ppm). The contents were mixed slowly using a mechanical stirrer. Once sufficient mixing of ingredients was achieved, the mixture was heated with stirring using an oil bath at about 100° C. for about 4 h and at 110° C. for about 45 minutes (reaction temperature about 104-105° C.). The conversion was monitored by IR disappearance of anhydride bands.

The same procedure was used for the synthesis of PIB diacrylate based on 1000 Mw PIBSA. It is believed that 2300 Mw PIBSA could also be used for this synthesis.

Procedure for PIB Acrylate 4 Synthesis molecular weight PIBSA (100.0 g), butylatedhydroxyl toluene (BHT, 0.27 g), and glycerol-1,3-diglycerolate diacrylate (34.84 g) were weighed in a 250 mL round bottom four necked flask equipped with a stainless steel stirrer with banana shaped blade, thermometer, condenser, and oil bath. The mixture was heated to 110° C. for 6-12 hours while stirring. The reaction was monitored by FT IR for the disappearance of anhydride peak. Once the anhydride peak disappeared, the flask content was cooled down to room temperature and analyzed for molecular weight by GPC.

Procedure for PIB Acrylate 5 Synthesis 1000 molecular weight PIBSA (100.0 g), butyl hydroxyl toluene (BHT) 0.23 g., and glycerol-1,3-diglycerolate diacrylate (17.42 g) were weighed in a 250 mL round bottom four necked flask equipped with a stainless steel stirrer with banana shaped blade, thermometer, condenser, and oil bath. The mixture was heated to 110° C. for 6-12 hours while stirring. The reaction was monitored by FTIR for the disappearance of anhydride peak. Once the anhydride peak disappeared, the flask content was cooled down to room temperature and analyzed for molecular weight by GPC.

Procedure for PIB Acrylate 6 Synthesis 1000 molecular weight PIBSA (100 g) butylatedhydroxyl toluene (BHT) 0.22 g., and glycerol-1,3-diglycerolate diacrylate (11.61 g) were weighed in a 250 mL round bottom four necked flask equipped with a stainless steel stirrer with banana shaped blade, thermometer, condenser, and oil bath. The mixture was heated to 110° C. for 6-12 hours while stirring. The reaction was monitored by FTIR for the disappearance of anhydride peak. Once the anhydride peak was disappeared, the flask content was cooled down to room temperature and analyzed for molecular weight by GPC.

Procedure for Diallyl Polyisobutylene Synthesis

In a 500 mL 4 necked flask equipped with a mechanical stirrer was taken 2300 molecular weight PIBSA (237 g, 101 mmol) in cyclohexane (200 mL). The mixture was stirred until all the PIBSA dissolved in cyclohexane. Diallylamine was added dropwise over a period of about 30 min. The resulting mixture was stirred at RT for 2 h. The IR showed complete disappearance of the IR bands for the anhydride group. The solvent was evaporated using rotovap and the residual solvent was removed on a Kugelrohr distillation set up. This gave the diallyl polyisobutylene.

Procedure for the Synthesis of PIB Acrylate 7

In a 2 L 4 necked flask equipped with a mechanical stirrer, was taken 2300 molecular weight PIBSA (635 g, 270 mmol) and glycerol monomethacrylate (21.6 g, 135 mmol). The mixture was stirred slowly for 15 minutes before triethylamine (0.66 g, 65 mmol) was added. Methylhydroquinone (325 mg, 500 ppm) was added and the mixture was heated at 110° C. for 3 h. The IR showed almost complete disappearance of anhydride bands. The mixture was transferred to a glass container and allowed to cool to RT.

The same procedure was used to make corresponding PIB acrylate 7 using 1000 molecular weight PIBSA.

Procedure for the Synthesis of PIB Acrylate 8

In a 4 necked 1 L flask equipped with a mechanical stirrer and a thermometer was taken 2300 molecular weight PIBSA (424 g, 184 mmol). The flask was heated to about 60° C. before 2-(2-aminoethoxy)ethanol (19.38 g, 184 mmol) was added dropwise for a period of about 30 min. The mixture was stirred at the same temperature for about 1 h at which time the IR shows the appearance of new band for the amide at around 1645 m$^{-1}$. The bath temperature was increased to about 170° C. As the reaction temperature reached about 140° C., nitrogen gas was bubbled through the mixture to flush out generated water. The bubbling was continued for about 2 h at the same temperature. At this point IR showed disappearance of the amide peak and a new peak for the imide appeared at about 1780 cm$^{-1}$. The reaction was stopped at this point and the material was used for the esterification with methacrylic acid.

In a 4 necked 2 L flask equipped with a mechanical stirrer and Dean-Stark set up, was taken imide alcohol obtained above (400 g, 163 mmol) in toluene (600 mL). Methacrylic acid (70 g, 813 mmol), PTSA (3.1 g, 16.2 mmol) and MeHQ (0.68 g, 1000 ppm) were added and the mixture was refluxed with azeotrope distillation of water for 10 h. After cooling to room temperature (RT), heptane (1 L) was added and the organic layer was washed several times with saturated aq. NaHCO$_3$ solution and brine. After drying over anhydrous MgSO$_4$, the solvent was evaporated on rotovap. The last traces of solvent were removed on Kugelrohr distillation set up. This gave the carboxylic acid free PIB acrylate 8 as a viscous brown liquid (380 g, 92%)

Procedure for the Synthesis of PIB Acrylate 10

In a 4 necked 500 mL flask equipped with a mechanical stirrer and a thermometer was taken a mixture of 2300 molecular weight PIBSA (147 g, 62.6 mmol), HEMA (8.55 g, 65.7 mmol) in the presence of 200 ppm of MeHQ in cyclohexane (80% solids). The mixture was heated at 105° C. (reaction temperature 95-96° C.) for about 2 h in the presence of catalytic amount of triethylamine (stir speed 250 rpm). The reaction was monitored by IR, which indicated near disappearance of anhydride carbonyl peaks. An additional 5% of HEMA was added after about 1 h of reaction time and the reaction was further stirred for 1 h. IR did not show change in the carbonyl intensity so the reaction was stopped at this point. The solvent was stripped of using rotovap (1 h at 80° C.) and the residual solvent was removed by Kugelrohr distillation set up (30 min at 65° C.). The PIB acrylate 10 was obtained in quantitative yield. However, some material was lost during transfer to a container.

Procedure for the Synthesis of PIB Acrylate 12

To a 1 L glass resin kettle equipped with overhead stirring, water condenser, thermo-control and external heat was added PIB acrylate 10 (220 g), MEHQ (100 ppm) (0.022 g) and cyclohexane (100 mL). The mixture was warmed to 30° C., whereby ethyl vinyl ether (11.6 g, 160.9 mmol) was added. The entire mixture was stirred overnight at 30° C. for 18 h before it was concentrated in vacuo at 50° C. and ~1 Torr until constant weight was achieved. Yield 92%.

Procedure for the Synthesis of PIB Acrylate 13

To a 1 L glass resin kettle equipped with overhead stirring, water condenser, thermo-control and external heat was added PIB acrylate 10 (220 g), MEHQ (100 ppm) (0.022 g) and cyclohexane (100 mL). The mixture was warmed to 30° C., whereby ethylene glycol vinyl ether (14.2 g, 160.9 mmol) was added. The entire mixture was stirred overnight at 30° C. for 18 h before it was concentrated in vacuo at 50° C. and ~1 Torr until constant weight was achieved. Yield 84.3%.

Microwave Preparation of PIB Acrylate 12

In a 35 mL glass microwave reactor tube equipped with magnetic stirring was added PIB acrylate 10 (10.0 g) and cyclohexane (10.0 mL). The mixture was pre-warmed to 50° C., whereby vinyl ether, such as ethyl vinyl ether (EVE) (5 g, 69.3 mmol) was added. The entire mixture was pre-stirred, sealed and then reacted in a microwave reactor at 132° C. for 10 minutes. The contents were pressure filtered through a 0.2 um PTFE micro-filter before it was concentrated in vacuo at 50° C. and ~1 Torr until constant weight was achieved.

Other PIB acrylates were prepared by reacting PIB acrylate 10 in the above process and ethylene glycol vinyl ether, 1,4-butanediol divinyl ether, and vinyl ether ethyl (meth)acrylate.

Photo Curable Composition Comprising Reactive Functionalized, PIB Grafted Polymer.

A curable composition comprising the above described PIB diacrylate I is shown below. The composition was prepared by adding the individual components in convenient order and mixing to dissolve components and to make the formulation homogenous

| Component | Wt % |
|---|---|
| Urethane diacrylate oligomer[1] | 25 |
| PIB diacrylate I | 35 |
| IBOA[2] | 25 |
| aromatic monoacrylate oligomer[3] | 15 |
| liquid UV photoinitiator blend[4] LTM | 2 |
| Total | 102 |

[1]CN9014 available from Sartomer USA, LLC.
[2]Isobornyl acrylate available from several suppliers.
[3]CN131B available from Sartomer USA, LLC.
[4]GENOCURE LTM available from Rahn USA Corp.

The curable composition was tested to have the following properties.

| parameter | Result |
|---|---|
| Viscosity (cone to plate; 15 s−1) | 4.6-4.7 Pa · s |
| 90°-Peel (PET-PET), 1 J/cm$^2$ UVA cure | 4.0-4.5 N/cm |
| Monofunctional PIB | (1.5 N/cm) |
| Mocon (g · mil/100 in$^2$ · day) | 12.0 |

Water vapor permeation was measured using a commercially available Mocon instrument. Details are available at http://www.mocon.com/permeation.php Viscosity was measured using a commercially available ARES-M rheometer. Peel adhesion was measured using an Instron 3300 instrument and following ASTM D3330/D3330M.

The composition has physical properties such as viscosity and flow that are suitable for application as a sealant. Cured products of the composition have properties advantageous for use as a barrier sealant, for example in an electronic display application.

While preferred embodiments have been set forth for purposes of illustration, the foregoing description should not be deemed a limitation of the disclosure herein. Accordingly, various modifications, adaptations and alternatives may occur to one skilled in the art without departing from the spirit and scope of the present disclosure.

What is claimed:

1. A reactive functionalized, PIB grafted polymer comprising:
an organic backbone Z, the backbone including one or more aliphatic groups, one or more aromatic groups, one or more heteroatoms or any combination thereof, wherein the backbone Z is not polyisobutylene; at least one reactive functionality terminal to the backbone; and at least two polyisobutylene groups Y pendant from the organic backbone Z, wherein the polymer is represented by one of the following formulas;

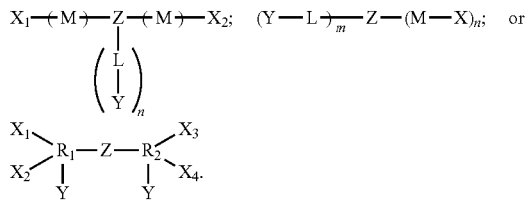

wherein organic backbone Z has a linear chain structure having 1 to about 50 atoms selected from the group consisting of C, H, N, O and S;
each M is independently selected from a covalent bond or an organic structure having 1 to about 20 atoms selected from the group consisting of C, H, N, O and S;
X, $X_1$, $X_2$, $X_3$ and $X_4$ are each independently H or a reactive functionality selected from acrylate, methacrylate, acrylamide, allyl, styrenic, vinyl ether, maleimide and N-vinylamide, but at least one of X, $X_1$, $X_2$, $X_3$ and $X_4$ in any formula must be a reactive functionality;
Y is a polyisobutylene group;
L connects one polyisobutylene group to one atom of the Z organic backbone or one atom of the M portion and each L is independently selected from a covalent bond or an organic structure having 1 to about 30 atoms selected from the group consisting of C, H, N, O and S;
R1 and R2 are each independently selected organic segments having 1 to about 30 atoms selected from the group consisting of C, H, N, O and S;
m is an integer from 2-10; and
n is an integer from 1-10.

2. The polymer of claim 1, having a weight average molecular weight (Mw) of about 1,000 to about 30,000.

3. The polymer of claim 1, in liquid form at room temperature.

4. The polymer of claim 1, represented by the formula;

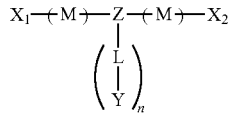

wherein
$X_1$ and $X_2$ are each independently H or a reactive functionality selected from acrylate, methacrylate, acrylamide, allyl, styrenic, vinyl ether, maleimide and N-vinylamide, but at least one of $X_1$ and $X_2$ must be a reactive functionality.

5. The polymer of claim 4, wherein both $X_1$ and $X_2$ comprise an independently selected reactive functionality.

6. The polymer of claim 4, wherein $X_1$ and $X_2$ are each a reactive functionality independently selected from acrylate or methacrylate.

7. The polymer of claim 1, represented by the formula;

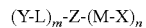

wherein
each X is independently H or a reactive functionality selected from acrylate, methacrylate, acrylamide, allyl, styrenic, vinyl ether, maleimide and N-vinylamide but at least one X must be a reactive functionality; and
L connects the polyisobutylene group Y to one atom of the Z organic backbone and each L is independently selected from a covalent bond or a structure having 1 to about 30 atoms selected from the group consisting of C, H, N, O and S.

8. The polymer of claim 7, wherein L is selected from a covalent bond, $C_{1-5}$ alkyl, a heteroatom, ester, thioester, amide, imide, cyclic imide, ketone, carboxyl, urethane, carbonate, urea and combinations thereof.

9. The polymer of claim 1, represented by the formula;

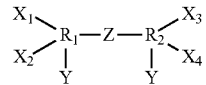

wherein
each Y is a polyisobutylene group.

10. The polymer of claim 9, wherein all of $X_1$, $X_2$, $X_3$ and $X_4$ comprise an independently selected reactive functionality.

11. The polymer of claim 9, wherein all of $X_1$, $X_2$, $X_3$ and $X_4$ comprise an independently selected acrylate reactive functionality or methacrylate reactive functionality.

12. The polymer of claim 9, wherein R1 and R2 are the same.

13. A curable composition comprising the polymer of claim 1.

14. The curable composition of claim 13, further comprising a cure-inducing component and a co-reactant component.

15. Cured reaction products of the curable composition of claim 13.

16. A method of making the reactive functionalized, PIB grafted polymer of claim 1, comprising:
providing polyisobutylenesuccinic anhydride;
providing at least compound selected from a diacrylate, a monomethacrylate, an acrylamide, an amino alcohol, an allyl substituted monomer and a vinyl ether;
optionally providing one or more of a solvent, a Lewis acid and a Lewis base; and
reacting the polyisobutylenesuccinic anhydride with the at least compound selected from a diacrylate, a monomethacrylate, an acrylamide, an amino alcohol and an allyl substituted monomer.

17. The polymer of claim 1, wherein Z comprises one or more aliphatic groups, one or more aromatic groups, one or more heteroatoms or any combination thereof; and Z can include one or more of branching, pendant aliphatic groups, pendant aromatic groups and pendant heteroatoms.

18. The polymer of claim 1 comprising L, wherein Y consists of a polyisobutylene group and L is selected from a covalent bond, $C_{1-5}$ alkyl, ester, thioester, amide, imide, cyclic imide, ketone, carboxyl, urethane, carbonate, urea and combinations thereof.

19. A reactive functionalized, PIB grafted polymer selected from the following structures:

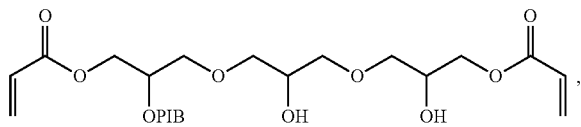

PIB acrylate 4

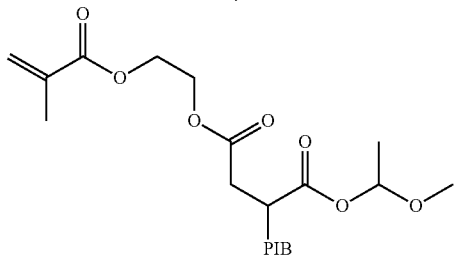

PIB acrylate 12 and

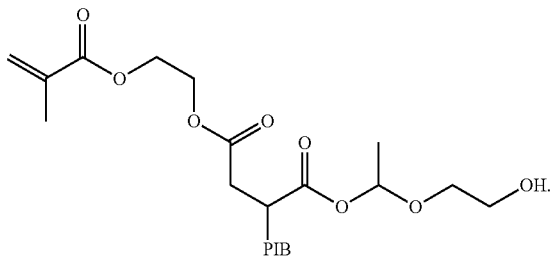

PIB acrylate 13

20. The polymer of claim 1 comprising $R_1$ and $R_2$, wherein Y consists of a polyisobutylene group and R1 and R2 are each independently selected from the group consisting of one or more C1-30 alkyl, C6-10 aryl, one or more heteroatoms selected from N, O or S atoms, or any combination thereof.

21. The polymer of claim 1, wherein:

the Z organic backbone is selected from the group consisting of one or more aliphatic groups, one or more aromatic groups, one or more heteroatoms or any combination thereof and Z can include one or more of branching, pendant aliphatic groups, pendant aromatic groups and pendant heteroatoms;

M is selected from the group consisting of a covalent bond, heteroatom, C1-10 alkyl, C6-10 aryl, amide, urethane, urea, C3-6 cycloaliphatic, C6-10 cycloaryl, polyether and combinations thereof, and M may include within that structure one or more linear, branched or cyclic portions, one or more saturated, unsaturated or aromatic portions, one or more substituents selected from carbonyl, amide, alkyl, C3-6 cycloalkyl, C6-10 cycloaryl, one or more N, O or S atoms, or any combination thereof;

Y consists of a polyisobutylene group;

L is selected from the group consisting of a covalent bond, $C_{1-5}$ alkyl, ester, thioester, amide, imide, cyclic imide, ketone, carboxyl, urethane, carbonate, urea and combinations thereof; and R1 and R2 are each independently selected from the group consisting of one or more C1-30 alkyl, C6-10 aryl, one or more heteroatoms selected from N, O or S atoms, or any combination thereof.

* * * * *

UNITED STATES PATENT AND TRADEMARK OFFICE
CERTIFICATE OF CORRECTION

PATENT NO. : 9,790,309 B2
APPLICATION NO. : 14/488824
DATED : October 17, 2017
INVENTOR(S) : Laxmisha Sridhar et al.

Page 1 of 1

It is certified that error appears in the above-identified patent and that said Letters Patent is hereby corrected as shown below:

Column 18, Line 23: Change "alklamino-$C_{1-5}$" to -- alkylamino- $C_{1-8}$ --.

Column 20, Line 24: Before "molecular weight", insert -- 1000 --.

Signed and Sealed this
Twenty-sixth Day of June, 2018

Andrei Iancu
*Director of the United States Patent and Trademark Office*